US012658187B2

(12) United States Patent
Dasher et al.

(10) Patent No.: US 12,658,187 B2
(45) Date of Patent: Jun. 16, 2026

(54) SYSTEMS AND METHODS FOR ENHANCED CONTEXTUAL RESPONSES WITH A VIRTUAL ASSISTANT

(71) Applicant: Adeia Guides Inc., San Jose, CA (US)

(72) Inventors: Charles Dasher, Lawrenceville, GA (US); Christopher Phillips, Hartwell, GA (US); Reda Harb, Issaquah, WA (US)

(73) Assignee: ADEIA GUIDES INC., San Jose, CA (US)

( * ) Notice: Subject to any disclaimer, the term of this patent is extended or adjusted under 35 U.S.C. 154(b) by 269 days.

(21) Appl. No.: 18/115,065

(22) Filed: Feb. 28, 2023

(65) Prior Publication Data

US 2024/0290329 A1     Aug. 29, 2024

(51) Int. Cl.
*G10L 15/22*         (2006.01)
*G10L 15/30*         (2013.01)

(52) U.S. Cl.
CPC .............. *G10L 15/22* (2013.01); *G10L 15/30* (2013.01)

(58) Field of Classification Search
None
See application file for complete search history.

(56) References Cited

U.S. PATENT DOCUMENTS

| | | | | |
|---|---|---|---|---|
| 7,831,609 B1 * | 11/2010 | Alexander | .......... | G06F 16/9566 707/765 |
| 9,263,039 B2 * | 2/2016 | Di Cristo | ................ | G10L 15/19 |
| 9,338,493 B2 * | 5/2016 | Van Os | .............. | H04N 21/4828 |
| 2002/0087555 A1 * | 7/2002 | Murata | ............... | G06F 16/4393 |
| 2014/0180672 A1 * | 6/2014 | Mo | ...................... | G06F 16/3344 704/9 |
| 2014/0278403 A1 * | 9/2014 | Jacob | ...................... | G06T 13/40 704/235 |
| 2015/0039418 A1 * | 2/2015 | Baluja | ................ | G06Q 30/0246 705/14.45 |
| 2018/0108343 A1 * | 4/2018 | Stevans | ................... | G10L 13/00 |
| 2020/0167384 A1 * | 5/2020 | Aher | ...................... | G06F 16/637 |
| 2020/0265829 A1 * | 8/2020 | Liu | ........................ | G10L 13/033 |
| 2021/0350801 A1 * | 11/2021 | Yoon | ...................... | G10L 15/32 |
| 2022/0415362 A1 * | 12/2022 | Jang | ...................... | G06F 16/685 |
| 2024/0096329 A1 * | 3/2024 | Wang | ...................... | G10L 25/63 |

* cited by examiner

*Primary Examiner* — Jesse S Pullias
(74) *Attorney, Agent, or Firm* — HG LAW LLP

(57)          ABSTRACT

A voice query is received via an input to a virtual assistant from a user. The virtual assistant determines a media context from first media content, the media context being colocated and contemporaneous with the voice query. The voice query is processed to generate a textual query and to identify a keyword from the voice query, and a response content provider is selected based on the keyword and the media context. The textual query and the media context are communicated to the response content provider via a network interface. Query response data is received from the response content provider via the network interface, the query response data comprising voice data. The virtual assistant then generates, at an output, a query response based on the query response data.

20 Claims, 10 Drawing Sheets

121

Receive Voice Query via
Input

123

Determine Media Context
from Contemporaneous First
Media Content

125

Process Voice Query to
Generate Textual Query

127

Determine Textual Response
Using Textual Query

129

Generate, at Output, Query
Response, Including Second
Media Content based on
Textual Response and Media
Context

131

SYSTEMS AND METHODS FOR ENHANCED CONTEXTUAL RESPONSES WITH A VIRTUAL ASSISTANT

BACKGROUND

This disclosure is generally directed to systems and methods for enhanced contextual responses with a virtual assistant. In particular, systems and methods are provided herein which determine the context of a query to a virtual assistant, and the virtual assistant utilizes that context in providing an enhanced response to the query.

SUMMARY

Virtual assistants, with which users interact through voice queries and commands, have been gaining in popularity over the past several years. While these virtual assistants are very capable at providing answers about a wide range of voice queries, they typically lack an ability to understand the context in which a voice query is input. For example, a user may direct a voice query to a device with a virtual assistant, and the virtual assistant may provide a query response in a voice that is preprogrammed and/or selected by the user from a list of celebrities like Samuel L. Jackson or Shaquille O'Neal. In other circumstances, a user may be consuming multimedia content, e.g., on a television or display screen connected with a virtual assistant, and when the user inputs a voice query to the virtual assistant, the content may be temporarily paused while the virtual assistant provides a verbal response to the query in a preprogrammed voice distinct from anyone or anything in the consumed content. In other circumstances, a user may be listening to music (or, e.g., a podcast or audiobook) on speakers or headphones connected to a virtual assistant, and when the user speaks a voice query to the virtual assistant, the music will be temporarily paused while the virtual assistant provides a verbal response to the query in the preprogrammed voice. In each of these exemplary circumstances, a query response provided by the virtual assistant does not take into account the contemporaneous contextual circumstances, such as the user's speech and/or currently provided media content, at the time of the voice input. In general, virtual assistants are not capable of determining any contemporaneous context unless they are pre-programmed with such context. Virtual assistants are not able to dynamically provide responses in a voice or rendering of a character contemporaneously appearing on screen or when mentioned by a user during a virtual assistant query. There exists a need for virtual assistants to generate an audio and/or visual response based on contemporaneous context of a voice input and/or content being consumed. Accordingly, the systems and methods disclosed herein provide for a virtual assistant which determines the contemporaneous context of a voice query and provides a query response based on the contemporaneous media context.

As discussed in greater detail below, the systems and methods presented herein enable a virtual assistant (e.g., a voice assistant) to provide enhanced contextual responses in response to voice queries from a user. Such enhanced contextual responses can improve virtual assistant systems by, e.g., making a voice assistant sound more human and/or familiar, diversifying voice responses, and encouraging further interaction with voice systems. Interaction with enhanced contextual responses of virtual assistant systems may enable improved data collection, collaborative content creation, and/or decentralized voice processing. Interaction may also facilitate branding opportunities, generate advertising opportunities, and prolong memory retention of experiences with familiar characters and voices. Generally, the virtual assistant may be a stand-alone device such as a smart home assistant, or it may be incorporated into, or accessed using, a smart phone, a speaker, headphones, a television, a smartwatch, a gaming system, and/or any other voice assistive interactive device.

Systems and methods are described herein that enable responding to voice queries of a user by accounting for contemporaneous contextual circumstances present for the user at the time of the voice query. Initially, the voice query from the user is received at an input of a virtual assistant. Voice queries may be considered voice queries, voice commands, and/or other speech input to a virtual assistant system. The virtual assistant then determines a media context for the voice query based upon the media content being presented to the user at the time the voice query was made. The virtual assistant also processes the voice query to generate a textual query, which is then used to determine the query response. The query response, which includes media content, is then generated and presented to the user.

In some embodiments, the virtual assistant also processes the voice query to identify a keyword. The keyword, once identified, is used in combination with the media context to select a response content provider. The textual query and the media context are then communicated to a response content provider, and query response data is received back from the response content provider. The query response data is then used to generate the query response, which is presented to the user.

BRIEF DESCRIPTION OF THE DRAWINGS

The above and other objects and advantages of the disclosure may be apparent upon consideration of the following detailed description, taken in conjunction with the accompanying drawings, in which.

DETAILED DESCRIPTION

Figure 1:
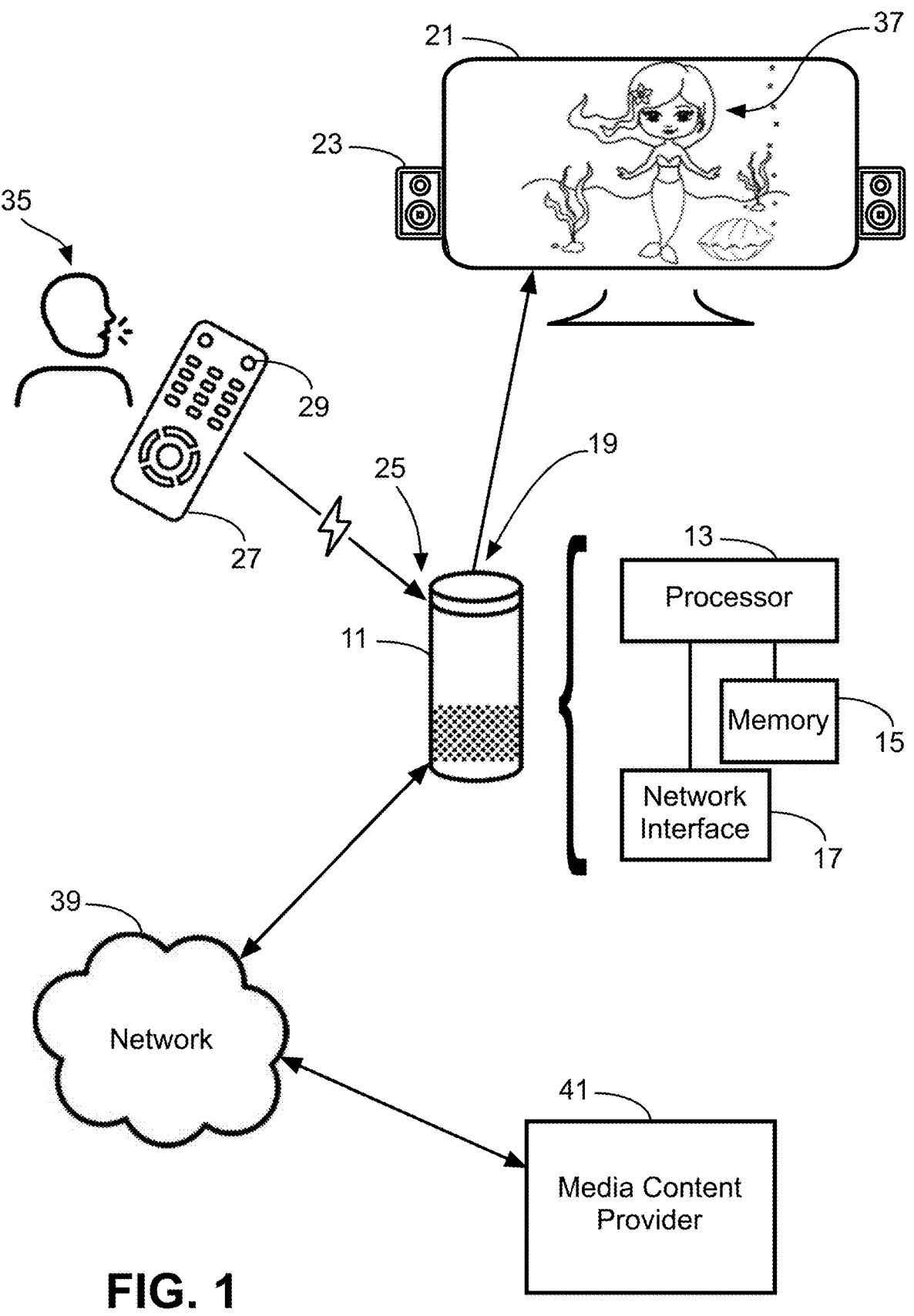
FIG. 1 shows an example environment in which a user may pose a voice query to a virtual assistant, using a remote in communication with the virtual assistant, and receive an enhanced contextual response from the virtual assistant as part of the query response, in accordance with some embodiments of the present disclosure.

Turning in detail to the drawings, FIG. 1 shows a first example of an environment in which a virtual assistant 11 may return an enhanced contextual response to a user's query. The virtual assistant 11 includes a processor 13 in communication with a memory 15 and a network interface 17, and as such, the virtual assistant 11 is a computing device. The processor 13 and the memory 15 in combination serve as control circuitry to perform the functions of the virtual assistant 11 as described herein. The virtual assistant 11 also includes an output 19 to enable the processor 13 to communicate with the display screen 21. The processor 13 also uses the output 19 to communicate with the speakers 23, which are shown integrated with the display screen 21. In certain embodiments, the speakers 23 may be separate from the display screen 21. In still other embodiments, the speakers 23 may be integrated with the virtual assistant 11 itself. The display screen 21 and the speakers 23 are used by the virtual assistant 11 to present audio and/or visual media content to the user 35. The virtual assistant 11 also includes an input 25 through which the processor 13 receives communications from the remote control 27. The remote control 27 includes a microphone 29, which the user 35 may use for voice control of the virtual assistant 11. Specifically, the user 35 may use the microphone 29 to communicate a voice query to the virtual assistant 11 via the input 25.

In the environment shown in FIG. 1, the virtual assistant 11 presents to the user 35 media content 37 on the display screen 21. By way of example, the media content 37 being presented to the user 35 is an animation of the Hans Christian Andersen story "The Little Mermaid", in which the main character, the little mermaid, is shown swimming in an underwater environment. Although the exemplary media content used here is an animation, it the media content could include real life actors or roles played by actors, and the use of real-life actors would not change the systems or processes disclosed herein. The media content 37 is therefore being presented to the user 35 at the location of the user 35. Thus, the user 35 and a voice query spoken by the user into the microphone 29 are colocated with the media content 37. During presentation of the media content 37, when the user 35 speaks a voice query into the microphone 29, the remote control 27 communicates the voice query to the input 25 of the virtual assistant 11. The voice query is therefore received at the input 25 of the virtual assistant 11 contemporaneously with presentation to the user 35 of the media content 37 on the display screen 21. As is described in detail below, the media context of the media content 37 that is contemporaneous with the voice query is used by the virtual assistant 11 as a basis for generating the query response.

The virtual assistant 11 may be configured to receive communications from the microphone 29 in an active mode or in a passive mode. In the passive mode, the virtual assistant 11 may be configured to receive communications from the microphone 29 on the remote control 27 only when a designated button on the remote control 27 is pressed by the user. In in the active mode, the virtual assistant 11 may be configured to actively receive and process all communications from the microphone 29 on the remote control 27 and provide responses only when a keyword is recognized by the virtual assistant 11. In certain embodiments, the microphone 29 may be incorporated into the virtual assistant 11 itself, the microphone 29 may be incorporated into the display screen 21, or the microphone may be located elsewhere in the vicinity of the virtual assistant 11 and the display screen 21. In such embodiments, the virtual assistant 11 may be configured to communications from the microphone 29 in an active mode or in a passive mode.

The processor 13 of the virtual assistant 11 may communicate with a network 39 through the network interface 17. Using the network 39, the virtual assistant 11 may access other data sources such as a response content provider 41, and such data sources may be used by the virtual assistant 11 as a basis for generating a query response. The steps by which the virtual assistant 11 processes voice queries and generates query responses is described below in greater detail. In certain embodiments, the network 39 may be a public network such as the Internet. In certain other embodiments, the network 39 may be some other private or public wide area network.

Figure 2:
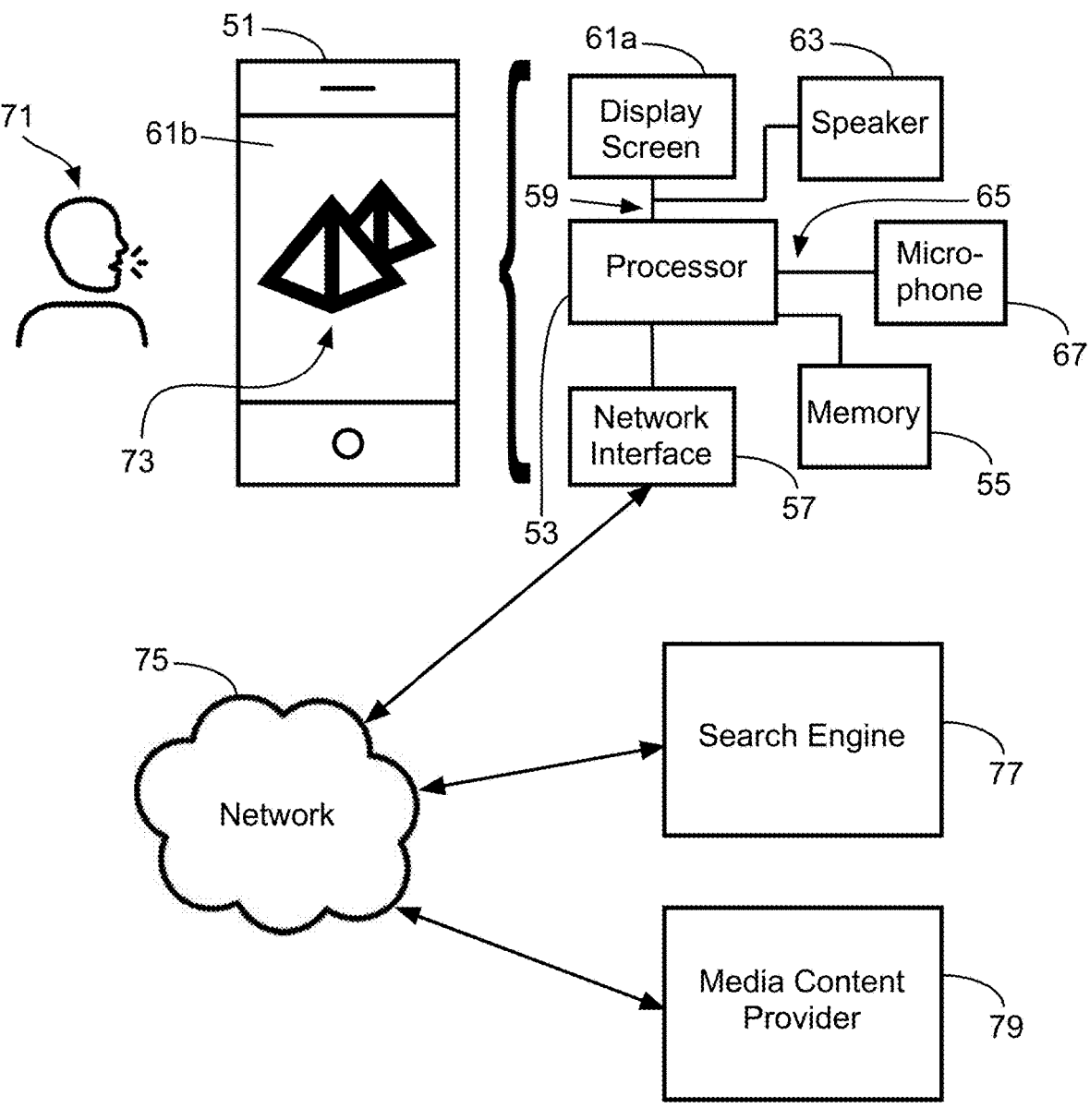
FIG. 2 shows an example environment in which a user may pose a voice query to a virtual assistant, incorporated into a smart phone, and receive an enhanced contextual response from the virtual assistant as part of the query response, in accordance with some embodiments of the present disclosure.

A second example of an environment in which a virtual assistant 51 may return an enhanced contextual response to a user's query is shown in FIG. 2. In this embodiment, the virtual assistant 51 is in the form of a smart phone and includes a processor 53 in communication with a memory 55 and a network interface 57. The processor 53 and the memory 55 in combination serve as control circuitry to perform the functions of the virtual assistant 51 as described herein. The processor 53 also includes an output 59 for communicating with the display screen 61a, which for purposes of clarity is shown in the figure both schematically (display screen 61a) and physically as the front face 61b of the virtual assistant 51. The processor 53 also uses the output 59 for communicating with the speaker 63. The display screen 61a and the speaker 63 are used by the virtual assistant 51 to present audio and/or visual media content to the user 71. The virtual assistant 51 also includes an input 65 through which the processor 53 receives audio signals from the microphone 67, which the user 71 may use for voice control of the virtual assistant 51. Specifically, the user 71 may use the microphone 67 to communicate a voice command or a voice query to the virtual assistant 51 via the input 65. The virtual assistant 51 may be configured to receive a voice command or voice query from the user 71 in an active mode or in a passive mode, similar to that described above. In certain embodiments, if the virtual assistant 51 does not recognize the spoken words of the user 71 as a voice command, the virtual assistant 51 may be configured so that the spoken words of the user 71 are instead interpreted as a voice query. Similarly, if the virtual assistant 51 does not recognize the spoken words of the user 71 as a voice command nor as a voice query, then the virtual assistant 51 may inform the user 71 that voice input is not understood.

In the environment shown in FIG. 2, the virtual assistant 51 presents to the user 71 media content 73 on the display screen 61a. By way of example, the media content 73 being presented to the user 71 is a multimedia video about the Great Pyramids of Giza. Because the virtual assistant 51 is in the form of a smart phone, which is handheld, the media content 73 is being presented to the user 71 at the location of the user 71. Thus, the user 71 and a voice query spoken by the user 71 into the microphone 67 are colocated with the media content 73. During presentation of the media content 73, when the user 71 speaks a voice query into the microphone 67, the voice query is received by the processor 53 via the input 65. The voice query is therefore received at the input 65 of the virtual assistant 51 contemporaneously with presentation to the user 71 of the media content 73 on the display screen 61a. As is described in detail below, the media context of the media content 73 that is contemporaneous with the voice query is used by the virtual assistant 51 as a basis for generating the query response.

The processor 53 of the virtual assistant 51 may communicate with a network 75 through the network interface 57. Using the network 75, the virtual assistant 51 may access other data sources such as a search engine 77 and a response content provider 79, and such data sources may be used by the virtual assistant 51 to obtain or generate query responses. The steps by which the virtual assistant 51 processes voice queries and generates query responses is described below in greater detail. In certain embodiments, the network 75 may be a public network such as the Internet. In certain other embodiments, the network 75 may be some other private or public wide area network.

The virtual assistant may take different forms than those described above while still enabling the processing of voice queries to provide the user with query responses that are based on the media context of contemporaneous media content. As one example, the virtual assistant may be in the form of a video game console, with the microphone incorporated into one of the wireless game controllers. In such an embodiment, the media content presented at the time of the voice query could be a video game that is being played by the user. As another example, the virtual assistant may be in the form of an on-board navigation system for a vehicle. In such an embodiment, the media content presented at the time of the voice query could be a location on a map that is displayed for navigation or landmark that is located on the route being displayed for travel.

Figure 3:
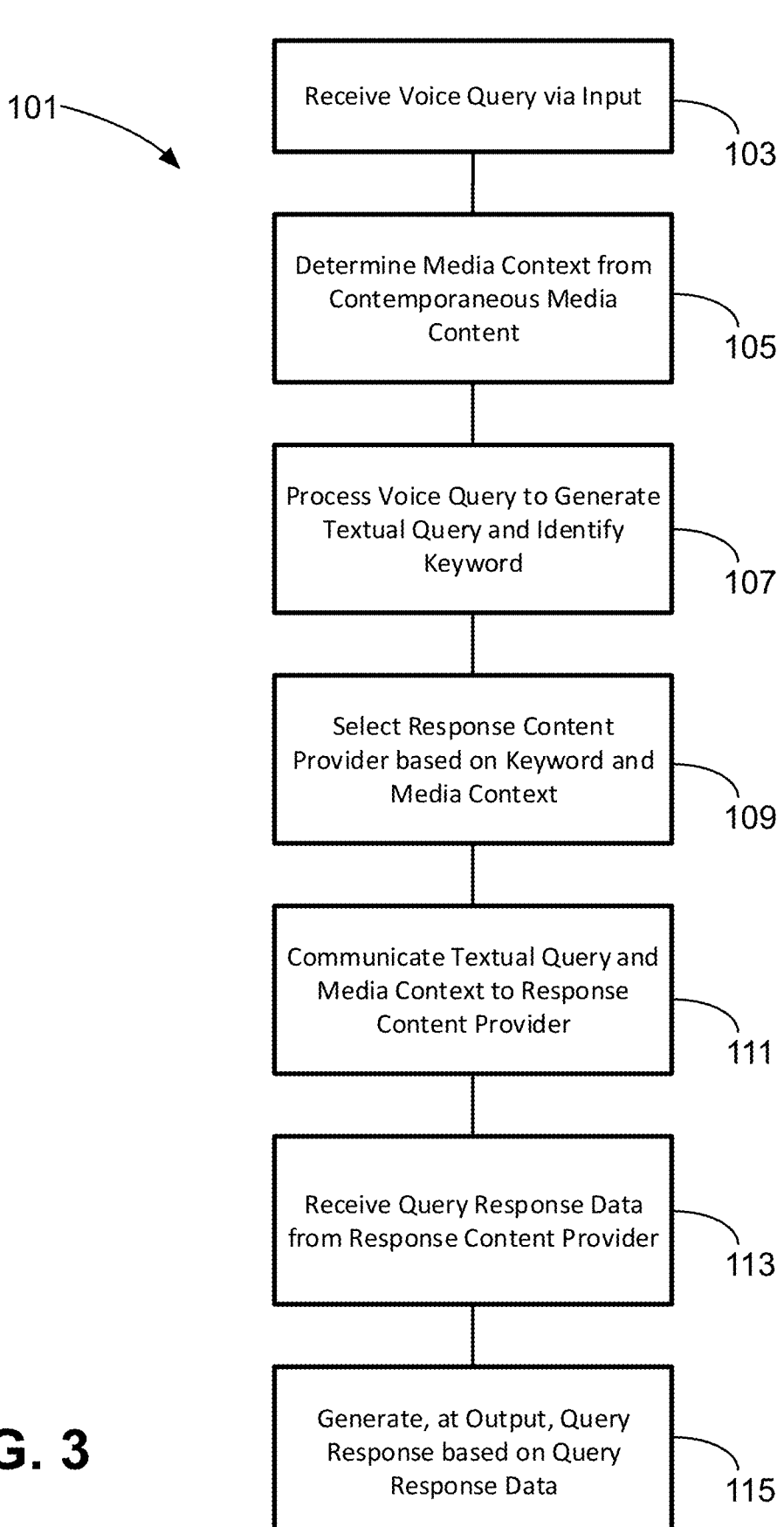
FIG. 3 shows a flowchart of illustrative steps involved in a virtual assistant receiving a voice query from a user and obtaining query response data from a response content provider to provide the user with enhanced contextual query responses based on contemporaneous media content, in accordance with some embodiments of the present disclosure.

FIG. 3 shows a flowchart illustrating the steps of a process 101 for enabling a virtual assistant to generate a query response that is informed by the context of media content being presented to the user at the time of the voice query. The process 101 may be implemented on any one of the aforementioned virtual assistants (e.g., virtual assistant 11, 51 and the like). In addition, one or more actions of the process 101 may be incorporated into or combined with one or more actions of any other process or embodiments described herein.

The process 101 shows example steps for enabling a virtual assistant to provide a user with context-relevant query responses based on media content that is presented to the user at the time of the voice query, such as the virtual assistant 11, 51 of FIGS. 1 and 2. At step 103, the virtual assistant receives a voice query via an input of the virtual assistant. For example, for the media content 37 shown in FIG. 1, the voice query received from the user is a question about the life cycle of giant clams, and that voice query is received by the virtual assistant while the user is watching the media content 37. When a user speaks a query to the virtual assistant, the query may be communicated to an automatic speech recognition (ASR) service and then passed to a natural language processing (NLP) service. Often, the output of the ASR service is fed to the NLP module for analysis and, e.g., to determine the substance of the query, e.g., whether a keyword is present and to generate the textual query. Some platforms today may combine the ASR services and NLP modules for faster and more accurate interpretation. In some embodiments, portions of ASR and/or NLP services may be performed locally and/or remotely, e.g., with servers in the cloud.

At step 105, the virtual assistant determines a media context from first media content that is being presented to the user contemporaneously with the voice query. For example, and again referring to the media content 37, the virtual assistant determines that the media context is an animated movie about mermaids with the main animated character being the little mermaid. In certain embodiments, the virtual assistant may use natural language processing to determine the media context. Typically, natural language processing may be accessed as a remote service online, such as through AWS. For example, natural language processing may be used to determine which character or actor within contemporaneous media content may be an appropriate choice for the character voice used in the query response. A user may state a query such as "How cold is it?" and the query response may come from the character wearing a large winter coat in the media content (as opposed to the character who isn't wearing such a winter coat). In certain other embodiments, metadata provided by response content provider or received from Internet database sources may be used to provide the media context.

At step 107, the virtual assistant processes the voice query to generate a textual query and to identify a keyword from the voice query. For example, the virtual assistant may identify the keyword as the title of the animated movie, the name of the studio that produced the movie, or the name of the little mermaid character. In another example, the virtual assistant may use natural language processing to analyze the voice query and therefore identify a keyword. In certain embodiments, where a keyword is not readily identifiable from the voice query itself, a keyword may be identified from other sources. Such sources may include metadata resulting from natural language processing of the voice query, search engines, and/or other sources available via the Internet. For example, the keyword for a movie may be identified as the title of the movie, the streaming service for the movie, the studio producing the movie, one or more actors or characters in the movie, and the like. As applied to the media content 37, the keyword could be "clams" if a response content provider has registered for that keyword. In instances where the voice query does not itself include a keyword, one may be identified from metadata gathered during step 105. Thus, the keyword for the media content 37 might be the title of the little mermaid movie.

At step 109, the virtual assistant selects a response content provider based on the keyword and the media context. In general, the response content provider is a third party which creates, produces, sells, distributes, or holds the copyright to media in the marketplace and which is making that media available for use in responding to user queries. For example, the virtual assistant selects the studio that created the animated movie as the media provider based on the keyword and media context. A keyword serves as the link between a voice query and a response content provider. The virtual assistant associates each response content provider with one or more keywords, and preferably each keyword is only associated with one response content provider. However, in the event a keyword is associated with more than one response content provider, the virtual assistant may include rules to resolve how and when the keyword is used to direct a textual query to each respective response content provider so that both do not receive and respond to the same textual query. Response content providers may register keywords with the virtual assistant in different ways. For example, a keyword may be registered with the virtual assistant by apps stored in the memory of the virtual assistant, by the virtual assistant having access to television channels, streaming video services, and the like, or by the user assigning or downloading a skill for the virtual assistant. In the case of apps registering a keyword, the app may serve as the response content provider, or alternatively the publisher of the app instead provides a separate service to fill the role of the response content provider. In the case of television channels and streaming video services, the studio, network, or service may fulfill the role of the response content provider. In certain embodiments, the virtual assistant may provide an API for registration of keywords and Internet addresses for contacting the response content provider so that the virtual assistant may utilized the response media provider as a resource when one or more of the registered keywords are identified in a user's query. In addition, a response media provider may register itself, or register by proxy its application developer, or other related entities as a "subject matter expert" for a particular subject, such that when a particular subject is detected in a voice query, the virtual assistant looks to the registration to determine the response content provider. Registration of keywords by a response content provider in this manner allows brands and/or franchises to be sources for responding to user voice queries when the registered keyword is identified from the voice query. Doing so provides a brand and/or franchise with opportunities for time in front of the user by responding to voice queries, and time in front of the user may translate directly to additional sales for the brand and/or franchise.

At step 111, the virtual assistant communicates the textual query and the media context to the response content provider via a network interface. This communication may enable the response content provider to assist in providing an original query response to the user that is based on the media content. This may be beneficial to the process 101 in instances where the response content provider has an interest in generating additional publicity for the little mermaid movie, whether because the response content provider is a copyright holder of the movie, a streaming video service with rights to stream the movie, a studio which created the movie, and the like, and because the response content provider may already have readily available information to provide a responsive answer to the textual query. Moreover, in instances where the response content provider is the originator of the little mermaid movie, it may have royalty free use of the main character of the movie, the little mermaid, to present the query response to the user.

At step 113, the virtual assistant receives query response data from the response content provider via the network interface, with the query response data including voice data. For example, the voice data may be in the form of an audio file of the little mermaid character speaking the query response. As another example, the voice data may be in the form of character voice synthesis data. In yet another example, the voice data may be in the form of a network location to access the character voice synthesis data and authorization to access the voice character voice synthesis data. With respect to the media content 37, the voice synthesis data includes parameters sufficient for the virtual assistant to generate a voice simulation of the little mermaid character. When synthesizing human language, a number of terms are defined and used in the art, such as: phonemes (a phoneme is a unit of sound that can distinguish one word from another in a particular language), Speech Synthesis Markup Language (SSML) metadata, and visemes (A viseme is the visual description of a phoneme in spoken language, defining the position of the face and mouth when a person speaks a word; each viseme depicts the key facial poses for a specific set of phonemes and may also be used to control the movement of character models to synchronize mouth movements with generated speech). In certain embodiments, the character voice data may describe the character voice using phonemes, SSML, or visemes such that the virtual assistant may synthesize the character voice.

At step 115, the virtual assistant generates, at an output, the query response from the query response data. For example, if the voice data received from the response content provider as part of the query response data is an audio file, the virtual assistant generates audio signals at the output using the audio file. Referring to the media content 37 of FIG. 1, this example may result in a query response which includes the voice of the little mermaid character providing the user information about the life cycle of giant clams. As another example, if the voice data received from the response content provider as part of the query response data is voice synthesis data, then the virtual assistant uses the voice synthesis data to generate, at the output, the query response in the form of a synthesized voice of the little mermaid character. This example may also result in a query response which includes the voice of the little mermaid character providing the user information about the life cycle of giant clams. While there is no significant difference in the results between these two examples, there may be a not insignificant difference in the distribution of resources used to generate the query response. In yet another example, in stances where the media context includes more than one character, the query response may include the voice of more than one of the characters.

As used herein, the term "media context" is defined to mean a categorization of part or all of the audio/visual media content and the circumstances under which the media content is presented to a user. The media content may be in the form of audible sounds, visual depictions, or multimedia content having both audible and visual components. Media content that includes visual depictions may be in the form of static images or video. The media context may include any actors or characters in the media content, scenery or settings of the media content, the subject matter of the media content, and the like. For example, the media context of a particular scene in an old western movie may be: action film; old west; sheriffs; bank robbers; horses; guns; and tumbleweeds. The media context may also be thematic and applicable to more than just a single scene, such as love, action, thriller, scary, conflict, romance, comedy, and the like. The media context may also include specific performing artists, such as actors in a movie, composers, musicians, and the like. The media context may also include visual scenery information, such as space, dessert, ocean, mountains, forest, and the like. The media context may also include the current television channel broadcasting the media content, the app used for streaming the media content, the service used for streaming the media content, the device user profile or service profile associated with presentation of the media content, user preferences or settings for a device on which the media content is presented, the user profile or service profile associated with a device, app, or service used to present the media content to the user, and the like. The media context may also include information about a device in communication with the virtual assistant 11. For example, if the display screen 21 is a smart TV and it is in communication with the virtual assistant 11, the media context may include information about or drawn from the smart TV, such as media context information received from the app being used to stream media content at the time of the voice query.

At step 105, as part of determining the media context, metadata may be determined from the media context. The use of metadata to describe media context can provide a somewhat standardized language that may be used to describe the media context by different entities, services, and/or devices (e.g., virtual assistants). For example, one way of determining media context is by performing an analysis of a scene from the media content 37 and identifying the elements in the scene. Such a method, however, might miss themes and other movie elements overarching the entire animated movie, among other things. Another way of determining media context is through Internet database sources (e.g., IMDB, Amazon X-Ray, and the like) that have accumulated large amounts of information about movies and already categorize not only entire movies, but also some of the most popular scenes withing movies. Yet another way of determining media context is by using automatic content recognition (ACR) services. Such services may be used to recognize audio and video content, and for recognized content, additional information is typically available from such services. Once the metadata is determined, the virtual assistant communicates both the textual query and the metadata to the identified response content provider.

At step 107, as part of processing the voice query to identify the keyword, the step 107 may further include communicating the textual query to a search engine via the network interface, receiving the search result from the search engine via the network interface, and identifying the keyword from the search result. For example, the voice query from the user may be stated using language from which there is no clearly identifiable keyword. To help overcome such situations, the textual query is submitted to a search engine on the Internet to take advantage of the more extensive language interpreting capabilities that are available to most search engines and the search results from submission of the textual query to the search engine. Once the search results are received, there is a greater chance of identifying a keyword from the search results as compared to just from the voice query itself. Taking this extra step of consulting a search engine may enable the virtual assistant to present a context-based query response that would not have been otherwise available but for the receipt of the search results.

At step 113, the query response data is received from the response content provider, and the query response data may include media content generated by the response content provider specifically for the query response. For example, the media content received from the response content provider may include voice data in the form of a voice simulation of the little mermaid character. In this example, the media content of the query response includes the voice of the little mermaid character speaking the query response, the voice being based on the media content 37.

In another example, the media content received from the response content provider may include a visual representation of the little mermaid character, such that the media content is based on the media context and the query response data. In this example, the media content of the query response includes an animated version of the little mermaid character, based on the media content 37, speaking the query response. In such a query response, which includes a voice simulation and a visual representation of a character, the mouth movements of the character are synched to the voice simulation in a manner that is well known in the art.

In instances where multiple characters are included in the media content 37, as determined by the media context, then the response content provider may select one of the characters to be included in the query response, the selection based on the voice query and the media context. Alternatively, the query response may include visual representations of more than one character from the media content 37, along with voice simulations for each included character.

In yet another example, the media content received from the response content provider may include visual scenery based on the media context and the query response data. Referring to the media content 73 of FIG. 2, if the voice query from the user is "How hot is it in the desert?" without identifying a particular desert, the media context may indicate that the desert that is best aligned with the user's question is the desert in which the Great Pyramids of Giza are located. Thus, in this example, the media content of the query response includes a visual representation of scenery (not a character) from the Western Desert (this is based on the media context of the media content 71) combined with a voice audio which provides information about how hot the climate is in the Western Desert. Such a query response may not include any recognizable character voice, as the media content 71 does not include a character for context.

At step 115, the query response may include media content generated based on the query response data, and this media content includes audio content that is based on the voice data. For example, the query response data includes both a textual query response and voice data, and the virtual assistant generates the media content from both the textual query response and the voice data, with the audio content portion of the media content being based on the voice data. In another example, the voice data may include character voice synthesis data based on the media context, such that the audio content portion of the media content is generated based on the voice synthesis data. In these two examples, the media content that is the query response is generated by the virtual assistant to include a voice simulation of a character from the media content 37 speaking the query response.

In another example, the query response data received from the response content provider includes character rendering data based on the media context, such that the media content of the query response is generated by the virtual assistant based on the character rendering data. In this example, the media content of the query response is generated by the virtual assistant to include a visual representation of the character from the media content 37 speaking the query response.

In yet another example, the query response data received from the response content provider includes scenery rendering data for scenery based on the media content, such that the media content of the query response is generated by the virtual assistant based on the scenery rendering data. In this example, the media content of the query response is generated by the virtual assistant to include visual scenery (not a character) from the media content 71 with the query response being spoken in a voice, which may not be the voice of a character in the media content 71.

Figure 4:
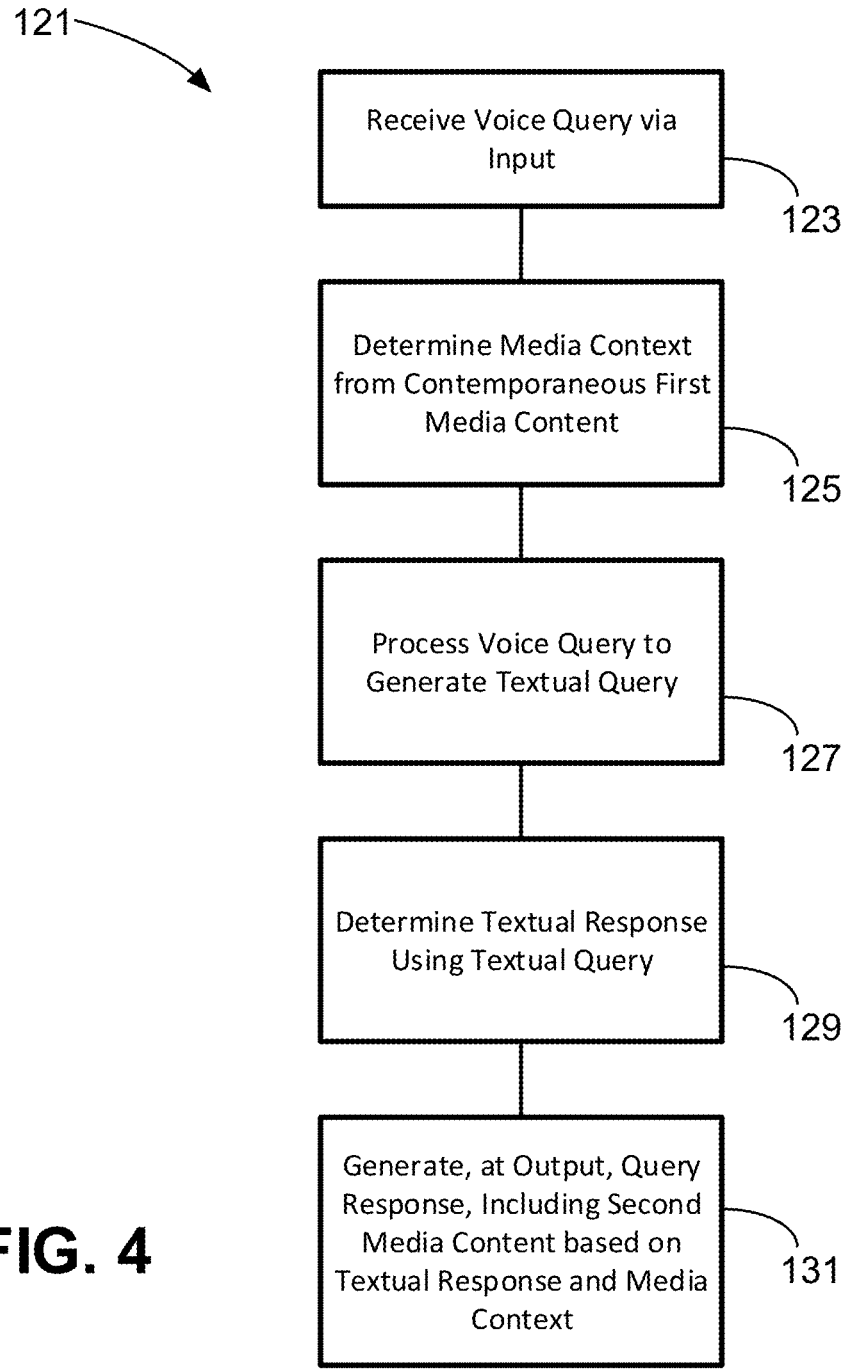
FIG. 4 shows a flowchart of illustrative steps involved in a virtual assistant receiving a voice query from a user and providing the user with enhanced contextual query responses based on contemporaneous media content, in accordance with some embodiments of the present disclosure.

FIG. 4 shows a flowchart illustrating the steps of another process 121 for enabling a virtual assistant to generate a query response that is informed by the context of media content being presented to the user at the time of the voice query. The process 121 may be implemented on any one of the virtual assistants (e.g., virtual assistant 11, 51 and the like) described above. In addition, one or more actions of the process 121 may be incorporated into or combined with one or more actions of any other process or embodiments described herein.

The process 121 shows example steps for enabling a virtual assistant to provide a user with context-relevant query responses based on media content that is presented to the user at the time of the voice query, such as the virtual assistant 11, 51 of FIGS. 1 and 2. At step 123, the virtual assistant receives a voice query via an input of the virtual assistant. For example, for the media content 37 shown in FIG. 1, the voice query received from the user is a question about whether mermaids are real creatures, and that voice query is received by the virtual assistant while the user is watching the media content 37. At step 125, the virtual assistant determines a media context from first media content that is being presented to the user contemporaneously with the voice query. For example, and again referring to the media content 37, the virtual assistant determines that the media context is an animated movie about mermaids with the main animated character being the little mermaid. At step 127, the virtual assistant processes the voice query to generate a textual query in a manner that is well known in the art.

At step 129, the virtual assistant determines the textual response to the voice query using the textual query. To do this, the virtual assistant may determine the textual response by accessing an external data source such as a search engine or a response content provider. In certain embodiments, the virtual assistant may determine the textual response by accessing both a search engine and a response content provider. In still other embodiments, the virtual assistant may have a local data source from which textual response may be obtained, in which case the virtual assistant may determine the textual response by accessing the local data source.

By way of example, the virtual assistant may identify a keyword within the voice query or the textual query, and using that keyword identify an appropriate response content provider from which to obtain the textual response. In this manner, the virtual assistant may determine the textual response by communicating with the response content provider. As part of this process, the virtual assistant may communicate the textual query and the media context to the response content provider via a network interface. This communication enables the response content provider to assist in providing a textual response to the user that is based on the media context. This may be beneficial to the process 121 in instances where the response content provider has an interest in generating additional publicity for the little mermaid movie, whether because the response content provider is a copyright holder of the movie, a streaming video service with rights to stream the movie, a studio which created the movie, and the like, and because the response content provider may already have readily available information to provide an appropriate textual response. Moreover, in instances where the response content provider is the originator of the little mermaid movie, it may have royalty free use of the main character of the movie, the little mermaid, to present the query response to the user.

By way of another example, the virtual assistant may identify a keyword within the textual query through use of a search engine. The virtual assistant may communicate the textual query to a search engine via the network interface and receive a search result from the search engine in response. The virtual assistant may then determine if the search result is appropriate for use as the basis of the textual response, or if the search result is appropriate for use to identify a keyword, which may then be used to identify a response content provider to assist in providing a textual response to the user in the manner described above. In general, the search result may be appropriate for use as the basis of a textual response if the virtual assistant has the capability to generate the query response based on the media context, such as by creating a simulated voice of a character from the media content 37 without the need for accessing external resources, e.g., a response content provider.

At step 131, the virtual assistant generates, at an output, the query response, which includes the response media content based on the textual response and the media context. For example, if the virtual assistant has the capability to generate the query response based on the media context, such as by creating a simulation of the voice of a character from the media content 37 using data residing in memory, then the virtual assistant may generate the query response itself. In another example, if the virtual assistant communicates with a response content provider to determine the textual response, then the response content provider may also provide query response data for generating the query response. The query response data may include a voice simulation of a character, based on the media context, as part of an audio media file, a visual representation of a character or visual scenery, based on the media context, as part of visual media file, or some combination of a voice simulation, a visual representation of a character, and visual scenery as part of an audio/visual media file. In some embodiments, which may include a voice and visual representation of character, the voice and the visual representation may be synchronized using visemes in a manner that is known in the art. In some embodiments, the query response data may include, in addition to the textual response, any one or combination of character voice synthesis data, character rendering data, and scenery rendering data, each based on the media context, so that the virtual assistant may generate the query response from the data provided. In certain embodiments, the virtual assistant may communicate to the response content provider the type of query response data that is desired.

Figure 5:
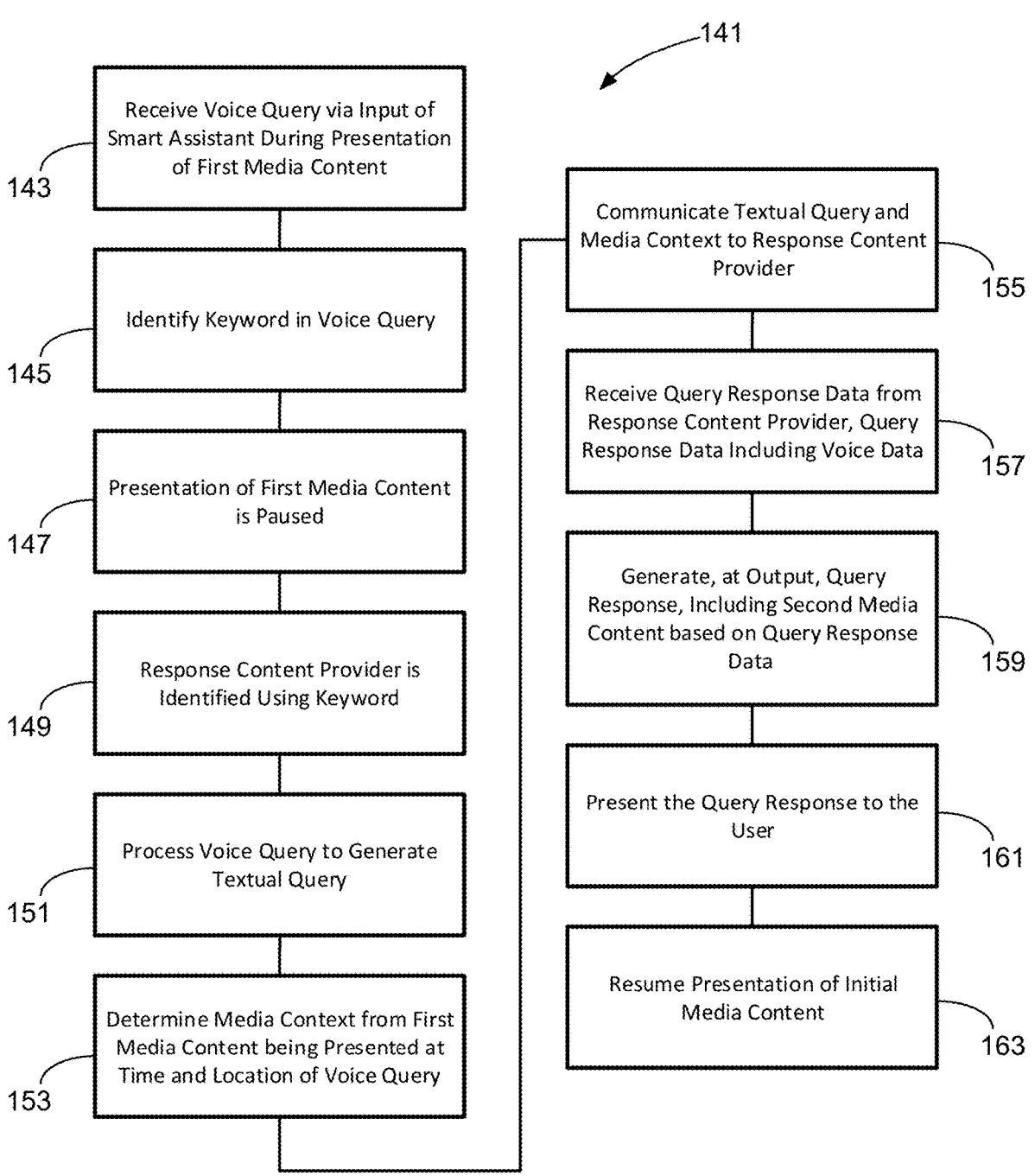
FIG. 5 shows a flowchart of illustrative steps involved in a virtual assistant providing contextual audio query responses.

FIG. 5 shows a flowchart illustrating the steps of a process 141 for enabling a virtual assistant to generate a query response and the communication and control with other devices, and interaction with the user, within the environments shown in FIGS. 1 and 2. The process 141 may be implemented on any one of the virtual assistants (e.g., virtual assistant 11, 51 and the like) described above. In addition, one or more actions of the process 141 may be incorporated into or combined with one or more actions of any other process or embodiments described herein.

At step 143, the virtual assistant receives a voice query via an input and during presentation of media content to the user. As part of this step, the user speaks a query which is received by the microphone associated with the virtual assistant, the microphone converts the spoken query to a voice query (e.g., an electronic signal representative of the spoken query), and the microphone communicates the voice query to the input of the virtual assistant receives. For example, the media content 37 of FIG. 1 may be presented to the user, and during that presentation, the user may speak a query asking about the life cycle of giant clams. At step 145, the virtual assistant identifies a keyword in the voice query. For example, because the virtual assistant is presenting the media content 37 to the user, the virtual assistant identifies the title of the media content 37 as a keyword. At step 147, while the virtual assistant works to provide a query response to the user, the virtual assistant pauses presentation of the first media content 37. At step 149, the virtual assistant identifies a response content provider using the keyword. For example, the response content provider may be the production studio that published the media content 37. At step 151, the virtual assistant processes the voice query to generate a textual query. In doing so, the virtual assistant is converting the voice query into a form that may be used by the response content provider to identify an appropriate response to the voice query. At step 153, the virtual assistant determines the media context from the media content, being displayed at the time and location of the voice query. By determining the media context in this manner, the virtual assistant is ensuring that the media context is colocated and contemporaneous with the voice query, and this helps improve the contextual relevance of the query response to the voice query. At step 155, the virtual assistant communicates the textual query and the media context to the response content provider. The response content provider may then use the textual query and the media context to identify an appropriate query response to the voice query.

At step 157, the virtual assistant receives query response data from the response content provider, and the query response data, for this process 141, includes voice data based on the media context. The voice data may be in the form of an audio file based on the media context, in the form of character voice synthesis data based on the media context, or in the form of a network location to access, and authorization to access, the character voice synthesis data. The character voice synthesis data enables the virtual assistant to create a voice simulation of a character based on the media context. For example, for media context based on the media content 37, the audio file may include a voice simulation of the little mermaid character, and the voice synthesis data may include parameters sufficient for the virtual assistant to create a voice simulation of the little mermaid character.

In certain embodiments, the query response data received from the response content provider may also include character data and/or scenery data based on the media context. The character data may be in the form of pre-rendered images or video of the character, in the form of character rendering data, or in the form of a network location to access, and authorization to access, the character rendering data Similarly, the scenery data may be in the form of static images or animated video of scenery for the background of the query response, in the form of scenery rendering data, or in the form of a network location to access, and authorization to access, the scenery rendering data. The character rendering data enables the virtual assistant to create static character images or animated character video for the query response, with the result being that the character depicted in the query response is based on the media context. The scenery rendering data enables the virtual assistant to create static images of scenery or animated scenery for the background of the query response, with the result being that the scenery depicted in the query response is based on the media context.

At step 159, the virtual assistant generates, at an output, the query response, and the query response includes response media content based on the query response data. For example, if the voice data received from the response content provider is an audio file, the virtual assistant generates audio signals at the output using the audio file. As another example, with reference to the media content 37, if the voice data received from the response content provider is character voice synthesis data, or a network location for access to character voice synthesis data, the virtual assistant uses the character voice synthesis data to synthesize the voice of the little mermaid character and generate, at the output, a query response which includes the synthesized voice of the little mermaid character.

In another example, if the query response data received from the response content provider includes character data, the virtual assistant will incorporate the character data into the query response. If the received character data is pre-rendered images or video, the virtual assistant will combine the pre-rendered images or video with the voice data as part of the query response. With reference to the media content 37, if the received character data is character rendering data, or a network location for access to character rendering data, the virtual assistant uses the character rendering data to render the little mermaid character and generate, at the output, a query response which includes the rendered version of the little mermaid character.

In yet another example, if the query response data received from the response content provider includes scenery data, the virtual assistant will incorporate the scenery data into the query response. If the received scenery data is pre-rendered images or video, the virtual assistant will combine the pre-rendered images or video with the voice data as part of the query response. With reference to the media content 37, if the received scenery data is scenery rendering data, or a network location for access to scenery rendering data, the virtual assistant uses the scenery rendering data to render scenery and generate, at the output, a query response which includes the rendered version of the scenery.

By processing the voice data, the character data, and the scenery data in the manner described above, the virtual assistant may generate, at the output, response media content both an audio content and a visual content, both based on the media context, as part of the query response may include a voice part, a rendered character part, and a rendered scenery part, such that the query response is multimedia content based on the media context. For example, with reference to the media content 37, the query response may include an animated character of the little mermaid with speech synced to a voice track, swimming around an ocean scene for background scenery, and explaining to the user the life cycle of giant clams. As is indicated above, this same response media content could be created by the response content provider and received by the virtual assistant, with the chief difference being the distribution of resources used to create the response media content. Although the prior example is illustrative of how voice, character, and scenery may be used as part of the query response, it is important to note that the query response could be voice only, voice and character only, or voice and scenery only. The manner in which the media content of the query response is created may be determined by the virtual assistant, taking into account the media context, the data provided by the response content provider, the allocation of available resources, and the like.

At step 161, the virtual assistant presents the query response to the user on the display screen. And At step 163, following presentation of the query response, presentation of the original media content is resumed (e.g., it was paused at step 147).

Figure 6:
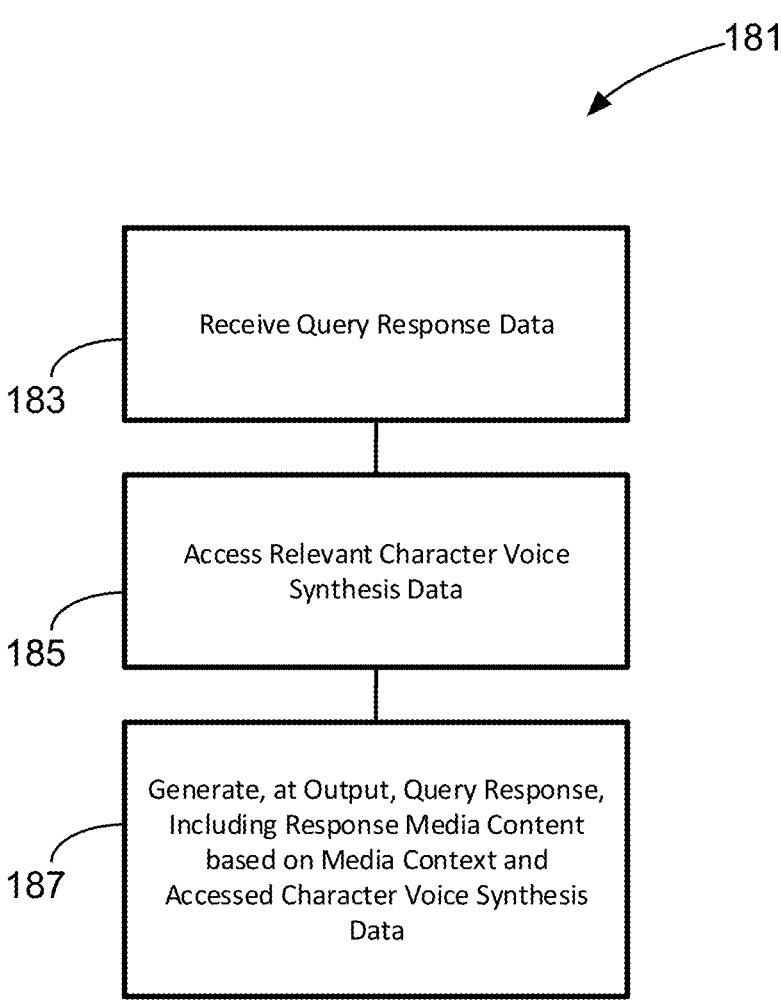
FIG. 6 shows a flowchart of illustrative steps involved in a virtual assistant receiving query response data and accessing relevant voice synthesis data for purposes of generating a query response.

FIG. 6 shows a flowchart illustrating the steps of a process 181 for enabling a virtual assistant to generate a query response following receipt of query response data, within the environments shown in FIGS. 1 and 2. The process 181 may be implemented on any one of the virtual assistants (e.g., virtual assistant 11, 51 and the like) described above. In addition, one or more actions of the process 181 may be incorporated into or combined with one or more actions of any other process or embodiments described herein.

At step 183, the virtual assistant receives the query response data from the response content provider. In this process 181, the query response data includes a network location where the virtual assistant may access further data to be used for generating a query response, along with authorization to access that further data. The data to be accessed by the virtual assistant includes at least character voice synthesis data, which may be used by the virtual assistant to create a voice simulation of a character based on the media context. The network location may be a remote server controlled or used by the response content provider to distribute character voice synthesis data for responding to user queries. At step 185, the virtual assistant accesses the network location to obtain a copy of the character voice synthesis data. The virtual assistant may store this copy in local memory while it is needed. At step 187, the virtual assistant generates, at an output, the query response, and the query response includes response media content based on the media context and the accessed character voice synthesis data. As part of this step 187, the virtual assistant uses the accessed voice synthesis data to generate, at the output, the query response in the form of a synthesized character voice. For example, with reference to the media content 37, the virtual assistant generates a synthesized voice of the little mermaid character. The resulting query response, which includes the response media content and is presented to the user, includes the voice of the little mermaid character providing the user information in response to the voice query.

Figure 7:
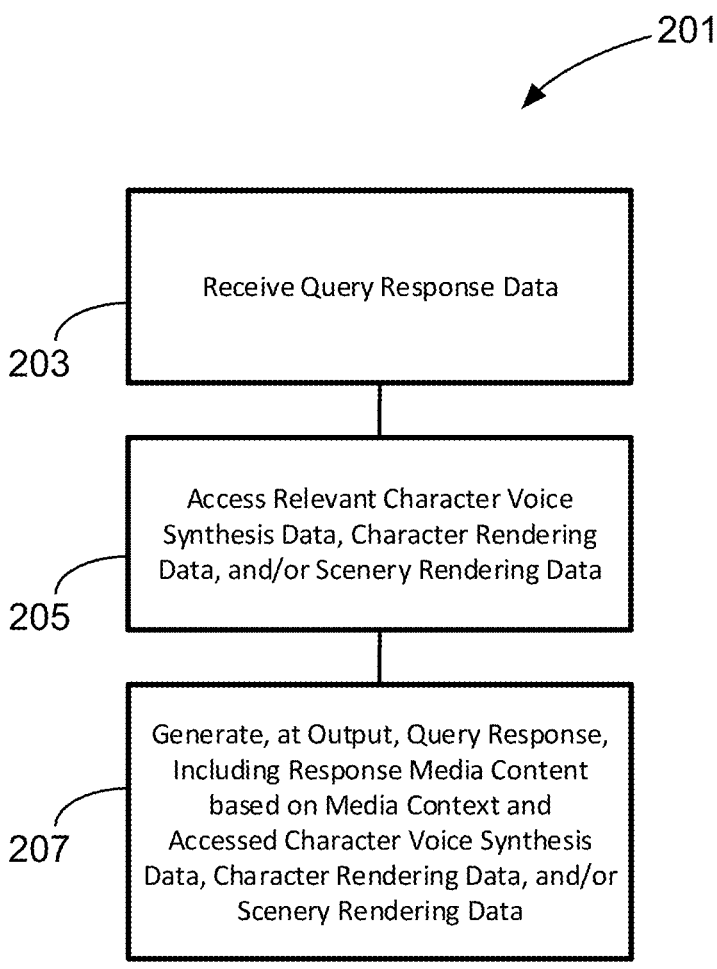
FIG. 7 shows a flowchart of illustrative steps involved in a virtual assistant receiving query response data and accessing relevant data for purposes of generating a query response.

FIG. 7 shows a flowchart illustrating the steps of a process 201 for enabling a virtual assistant to generate a query response a query response following receipt of query response data, within the environments shown in FIGS. 1 and 2. The process 201 may be implemented on any one of the virtual assistants (e.g., virtual assistant 11, 51 and the like) described above. In addition, one or more actions of the process 201 may be incorporated into or combined with one or more actions of any other process or embodiments described herein.

At step 203, the virtual assistant receives the query response data from the response content provider. In this process 201, the query response data includes a network location where the virtual assistant may access further data to be used for generating a query response, along with authorization to access that further data. The data to be accessed by the virtual assistant includes at least character voice synthesis data, character rendering data, and scenery rendering data. The character voice synthesis data enables the virtual assistant to create a voice simulation of a character based on the media context, the character rendering data enables the virtual assistant to create static character images or animated character video of the query response, and the scenery rendering data enables the virtual assistant to create static images of scenery or animated scenery for the background of the query response. The network location may be a remote server controlled or used by the response content provider to distribute the data used by the virtual assistant for responding to user queries. At step 205, the virtual assistant accesses the network location to obtain a copy of one or more of the character voice synthesis data, the character rendering data, and the scenery rendering data. The virtual assistant may store copies of the downloaded data in local memory while it is needed. At step 207, the virtual assistant generates, at an output, the query response, and the query response includes response media content based on the media context and the accessed data. As part of this step 207, the virtual assistant may use the accessed data to generate, at the output, the query response, which may include one or more of a synthesized character voice, a rendered character, a rendered scenery. For example, with reference to the media content 37, the query response may include an animated character of the little mermaid with speech synced to a voice track, swimming around an ocean scene for background scenery, and explaining to the user the life cycle of giant clams.

Figure 8:
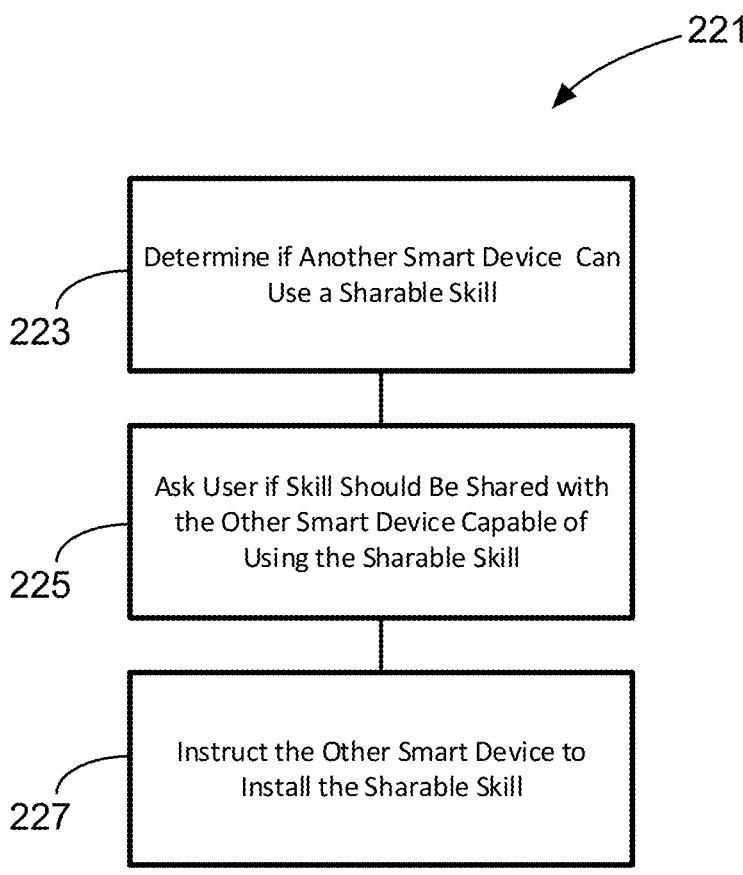
FIG. 8 shows a flowchart of illustrative steps involved in a virtual assistant sharing the skill for identifying keywords with other devices in a logical grouping.

FIG. 8 shows a flowchart illustrating the steps of a process 221 for enabling a virtual assistant to share keyword identification skills with other devices in a logical grouping. The environment shown in FIG. 1 includes the virtual assistant 11, the display screen 21, and the remote control 27, and while the virtual assistant has heretofore been described as the only "smart" device (e.g., an electronic device programmed to connect to other devices and networks and to operate interactively and, to some extent, autonomously with a user and other devices), the display screen 21 may be a smart TV and/or the remote control 27 may be a smart device. The process 221 may be implemented on any one of the virtual assistants (e.g., virtual assistant 11, 51 and the like) described above or on any other smart device. In addition, one or more actions of the process 221 may be incorporated into or combined with one or more actions of any other process or embodiments described herein.

The following are examples of user interactions with a virtual assistant processing user queries, e.g., as described above.

In a first example, a user may interact with a virtual assistant using a remote control that includes a microphone. The user asks a simple query "Hey Disney™, what time is it?" The term Disney™ here is identified as a keyword, and the virtual assistant reaches out to the designated server of the registered response content provider to obtain query response data. The virtual assistant presents the query response to the user in the form of a simulated voice of a Disney™ character while also displaying to the user an image of the character, with the voice telling the user the current time of day.

In yet another example, the query response includes both audio and visual content, with both being based on the contemporaneous media context. The audio content is presented to the user through a speaker incorporated into the virtual assistant device, while virtual assistant presents the visual content to the user on a display screen connected to the virtual assistant device.

In yet another example, the virtual assistant is in a logical grouping with a smart TV, and the smart TV is displaying an episode of The Mandalorian™ from Disney™. The user asks a query "Hey Assistant, what is Baby Yoda's real name?" In response the virtual assistant identifies "Yoda" as a registered keyword, communicates with the smart TV to pause playback of the episode, and consults the designated server of the registered response content provider to obtain query response data. The virtual assistant communicates with the smart TV to present the query response to the user, the query response including both audio and visual content. The audio content is in a voice of a character from The Mandalorian™, while the visual content may be a static image from The Mandalorian™ or a rendering of one of the characters from The Mandalorian™ providing the user with the answer.

In yet another example, the virtual assistant is incorporated into a smart TV and is associated with a remote control that includes an incorporated microphone. When the user presses the button on the remote to ask the query, the smart TV is displaying the movie Monsters Inc.™ from Disney™. The query is a general question about the movie, and at the time of the query, the two main characters are on the screen. The user asks a simple query "Hey Disney™, what time is it?" The term Disney™ is identified as a keyword. In response, playback of the movie is paused on the smart TV, and the virtual assistant consults the designated server of the registered response content provider to obtain query response data. The query response is presented to the user on the smart TV, the query response including both audio and visual content. The query response data from the response content provider includes both voice synthesis data (e.g., phonemes or SSML) and character rendering data (e.g., visemes) for one of the two characters that were on the screen at the time of the query. From the query response data, the virtual assistant renders response media content to include an animated version of the character from the movie and synchronizes the mouth and facial movements of the character with the synthesized character voice. The response media content may then be generated on the smart TV to present the query response to the user to provide the user with the current time of day.

In yet another example, the virtual assistant is incorporated into a smart TV and is associated with a remote control that includes an incorporated microphone. When the user presses the button on the remote to ask the query, the smart TV is displaying a scene from a Disney™ movie with two actors interacting. The user asks the query, "What are your favorite Disney™ animated movies?" Again, the term Disney™ is identified as a keyword. In response, playback of the movie is paused on the smart TV, and the virtual assistant consults an Internet database source to determine which two actors were on the screen at the time of the query. The virtual assistant then consults the designated server of the registered response content provider to obtain query response data, providing the response content provider as the media context information about the movie, the two characters, and the two actors. The query response is presented to the user on the smart TV, the query response including both audio and visual content. The query response data from the response content provider includes both voice synthesis data (e.g., phonemes or SSML) and actor rendering data (e.g., visemes) for each of the two actors who were on the screen at the time of the query. From the query response data, the virtual assistant renders response media content to include rendered versions of both actors, in character, from the movie and synchronizes the mouth and facial movements of both actors with the respective synthesized character voices. The response media content may then be generated on the smart TV to present the query response to the user to provide the user with the current time of day. The response media in this example may include one actor/character stating, "My favorite animated Disney™ movie is The Descendants™. I just love the singing and dancing!" after which the other actor/character states, "My favorite Disney™ movie is Pirates of the Carribean™, because I've always wanted to be a pirate!"

In another example, a user may interact with a virtual assistant using a remote control that includes a microphone. The user asks a simple query "How cold is it there?" while a movie is playing. The virtual assistant pauses playback of the movie, and then begins determining the media context for the query. The virtual assistant may determine the media context by communicating first with automatic content recognition (ACR) services through the Internet, or if the movie can be identified from a streaming service provider, the virtual assistant may identify information about the movie using other database resources (e.g., IMDB or Amazon X-Ray). Once the media context has been constructed, the virtual assistant may utilize a search engine to obtain climate or weather information. As part of this example, the media context may include character and scene information, and the response content provider may be a service that provides voice synthesis data for actors and characters. The keyword for this example may be the actor's name, and the media context may include the character name and the location of the scene portrayed in the movie. For purposes of this example, the character in the media content is: James May; and the media context is: snow, location of Hakkaido, Japan. The query response may then be a simulation of the "James May" voice stating that in Hakkaido, Japan it gets very cold in winter, as low as −4 degrees Celsius.

In environments where other smart devices are present with the virtual assistant 11, whether in a room, spread across multiple rooms, or throughout an entire home, logical groupings may be created so that the virtual assistant 11 is able to communicate with each of the other smart devices and all smart devices are able to communicate with each other. In such logical groupings of smart devices, the smart devices may be enabled to share skills (e.g., in the form of plug-ins, extensions, and the like) such as the skill to identify a keyword and the association between the keyword and a response content provider. Skills may also include multiple keywords associated with a response content provider. Skills may also provide other functionality, including any other process described herein. Skills may be acquired in the form of an app, a plug-in, or by incorporation of any other data or programmatic functions. As described above, the virtual assistant 11 already includes the skill of identifying a keyword and associating that keyword with a response content provider. At step 223, the virtual assistant 11 may communicate with the other smart devices in the logical grouping to determine if the other smart devices are able to use a sharable skill the virtual assistant 11 has already acquired. For example, the virtual assistant 11 may communicate with the other smart devices to determine if any of the other smart devices are able to use the sharable skill of identifying a keyword. For each smart device in the logical grouping, this determination may be made by, for example, identifying the type of smart device, identifying the operating system of the smart device, and identifying whether the smart device has access to a microphone, among other factors. Once the virtual assistant 11 has identified another smart device capable of using the sharable skill, at step 225 the virtual assistant will ask the user if the sharable skill should be shared with the other smart device. If the user responds in the negative, the skill is not shared. However, if the user responds in the affirmative, then at step 227 the virtual assistant 11 instructs the other smart device to install the sharable skill. Such instructions may include a network location where the smart device may download the sharable skill. By sharing skills in this manner, the various smart devices within a logical grouping may obtain improved functionality.

In addition to the advantages presented by the sharing of skills, the existence of logical groupings may present other advantages. For example, in environments where the display screen 21 is a smart TV, communication between the virtual assistant 11 and the smart TV may be used for enhancing performance of the processes described herein. In particular, the virtual assistant 11 may communicate with the smart TV to control the smart TV, such as for pausing and restarting playback of the media content, or for displaying media content, such as a query response. Similarly, the smart TV may communicate with the virtual assistant 11 to provide information about the media content presented to the user at the time of a voice query, thereby enhancing the media context. Thus, multiple devices in a logical grouping may be used to perform and enhance the processes disclosed herein.

Figure 9:
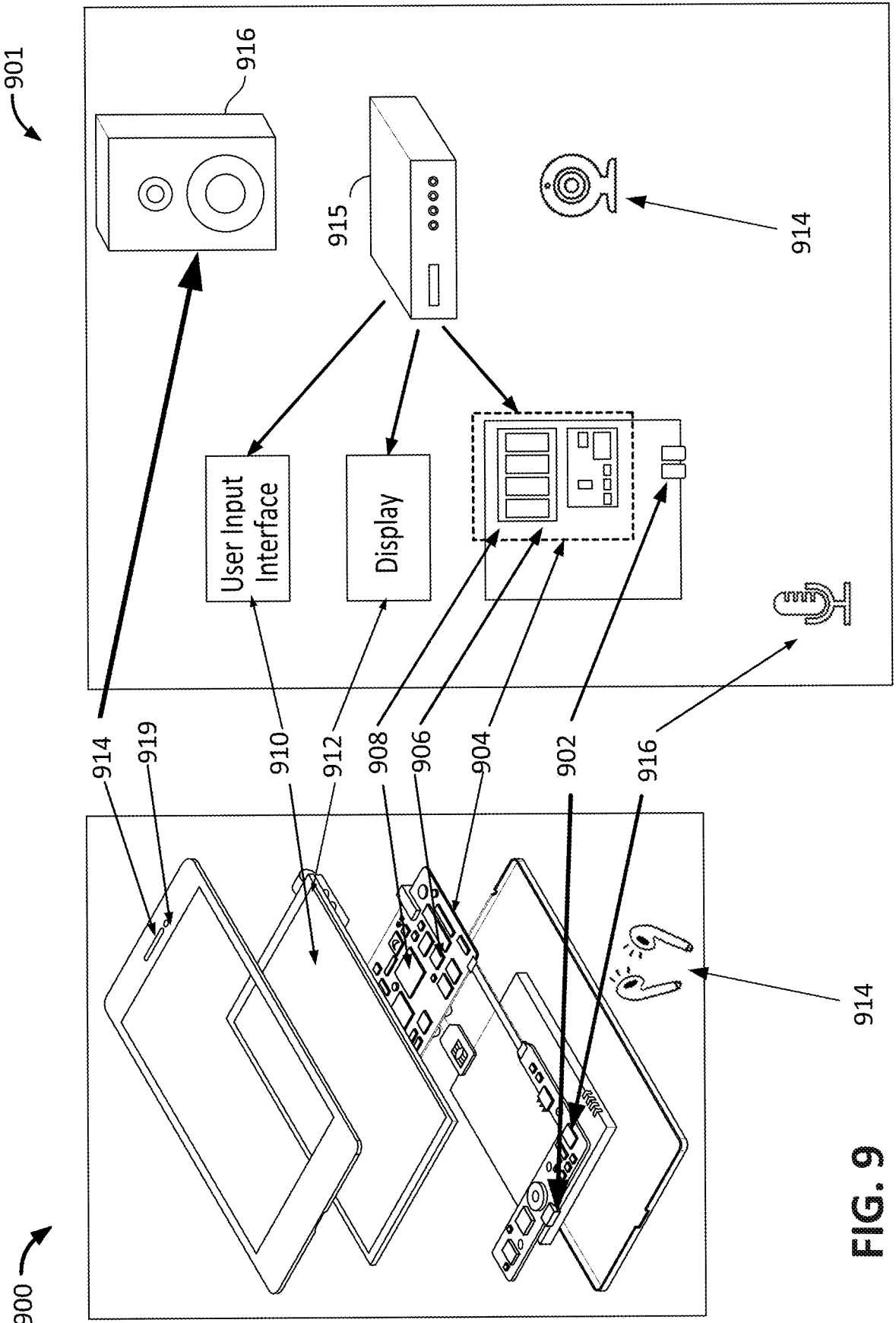
FIG. 9 shows illustrative user equipment devices, in accordance with some embodiments of this disclosure.
Figure 10:
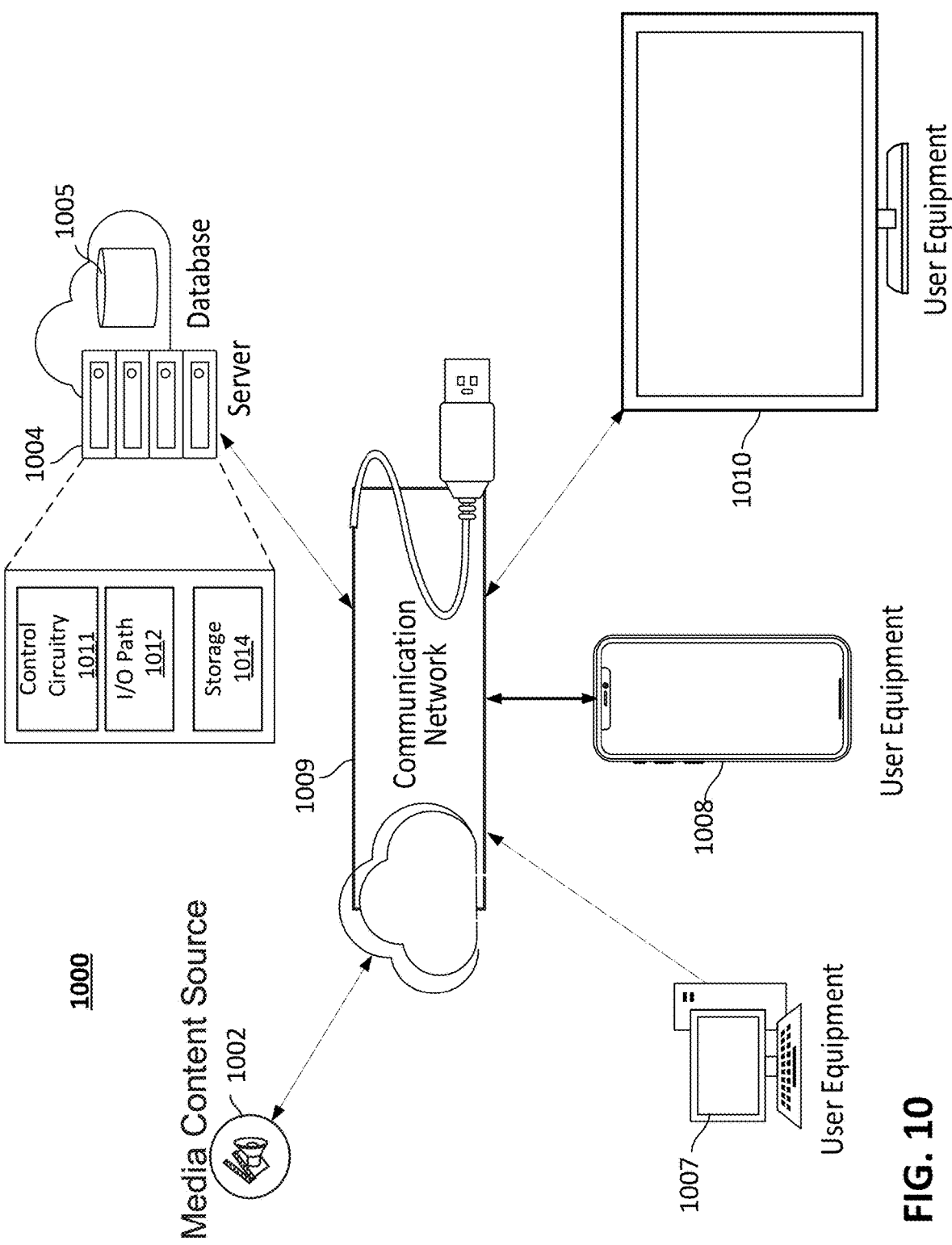
FIG. 10 shows illustrative systems, in accordance with some embodiments of this disclosure.

FIGS. 9 and 10 describe illustrative devices, systems, servers, and related hardware into which a virtual assistant may be incorporated, in accordance with some embodiments of this disclosure. FIG. 9 shows generalized embodiments of illustrative user devices 900 and 901, which may correspond to, e.g., the virtual assistant 11 and/or 51 of FIG. 1 or FIG. 2. For example, user equipment device 900 may be a smartphone device, a tablet, smart glasses, a virtual reality or augmented reality device, or any other suitable device capable of interacting with a user and capable of transmitting and receiving data over a communication network. In another example, user equipment device 901 may be a television equipment system or device. A television equipment device 901 may include a set-top box 915. The set-top box 915 may be communicatively connected to a microphone 916, audio output equipment (e.g., speaker or headphones 914), and a display 912. In some embodiments, the microphone 916 may receive audio corresponding to a voice of a user, e.g., a voice command or voice query. In some embodiments, the display 912 may be a television display or a computer display. In some embodiments, the set-top box 915 may be communicatively connected to a user input interface 910. In some embodiments, the user input interface 910 may be a remote-control device. The set-top box 915 may include one or more circuit boards. In some embodiments, the circuit boards may include control circuitry, processing circuitry, and storage (e.g., RAM, ROM, hard disk, removable disk, etc.). In some embodiments, the circuit boards may include an input/output path. More specific implementations of television equipment devices are discussed below in connection with FIG. 9. In some embodiments, device 900 may comprise any suitable number of sensors, as well as a GPS module (e.g., in communication with one or more servers and/or cell towers and/or satellites) to ascertain a location of device 900.

Each one of the user equipment device 900 and the user equipment device 901 may receive content and data via an input/output (I/O) path 902. The I/O path 902 may provide content (e.g., broadcast programming, on-demand programming, Internet content, content available over a local area network (LAN) or wide area network (WAN), and/or other content) and data to control circuitry 904, which may comprise processing circuitry 906 and storage 908. The control circuitry 904 may be used to send and receive commands, requests, and other suitable data using the I/O path 902, which may comprise I/O circuitry. The I/O path 902 may connect the control circuitry 904 (and specifically processing circuitry 906) to one or more communications paths (described below). I/O functions may be provided by one or more of these communications paths, but are shown as a single path in FIG. 9 to avoid overcomplicating the drawing. While the set-top box 915 is shown in FIG. 9 for illustration, any suitable computing device having processing circuitry, control circuitry, and storage may be used in accordance with the present disclosure. For example, the set-top box 915 may be replaced by, or complemented by, a personal computer (e.g., a notebook, a laptop, a desktop), a smartphone (e.g., device 900), a tablet, a network-based server hosting a user-accessible client device, a non-user-owned device, any other suitable device, or any combination thereof.

The control circuitry 904 may be based on any suitable control circuitry such as processing circuitry 906. As referred to herein, control circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, control circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, the control circuitry 904 executes instructions for the virtual assistant stored in memory (e.g., storage 908). Specifically, the control circuitry 904 may be instructed by the virtual assistant to perform the functions discussed above and below. In some implementations, processing or actions performed by the control circuitry 904 may be based on instructions received from the virtual assistant.

In client/server-based embodiments, the control circuitry 904 may include communications circuitry suitable for communicating with a server or other networks or servers. The virtual assistant may be a stand-alone application implemented on a device or a server. The virtual assistant may be implemented as software or a set of executable instructions. The instructions for performing any of the embodiments discussed herein of the virtual assistant may be encoded on non-transitory computer-readable media (e.g., a hard drive, random-access memory on a DRAM integrated circuit, read-only memory on a BLU-RAY disk, etc.). For example, in FIG. 9, the instructions may be stored in storage 908, and executed by control circuitry 904 of a device 900.

In some embodiments, the virtual assistant may be a client/server application where only the client application resides on device 900, and a server application resides on an external server (e.g., server 1004 and/or server 1016). For example, the virtual assistant may be implemented partially as a client application on control circuitry 904 of device 900 and partially on server 1004 as a server application running on control circuitry 1011. Server 1004 may be a part of a local area network with one or more of devices 900 or may be part of a cloud computing environment accessed via the internet. In a cloud computing environment, various types of computing services for performing searches on the internet or informational databases, providing storage (e.g., for a database) or parsing data are provided by a collection of network-accessible computing and storage resources (e.g., server 1004), referred to as "the cloud." Device 900 may be a cloud client that relies on the cloud computing capabilities from server 1004 to determine whether processing should be offloaded and facilitate such offloading. When executed by control circuitry 904 or 1011, the virtual assistant may instruct control circuitry 904 or 1011 circuitry to perform processing tasks for the client device and facilitate a media consumption session integrated with social network services. The client application may instruct control circuitry 904 to determine whether processing should be offloaded.

Control circuitry 904 may include communications circuitry suitable for communicating with a server, social network service, a table or database server, or other networks or servers The instructions for carrying out the above-mentioned functionality may be stored on a server (which is described in more detail in connection with FIG. 9). Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communication networks or paths (which is described in more detail in connection with FIG. 9). In addition, communications circuitry may include circuitry that enables peer-to-peer communication of user equipment devices, or communication of user equipment devices in locations remote from each other (described in more detail below).

Memory may be an electronic storage device provided as storage 908 that is part of control circuitry 904. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 908 may be used to store various types of content described herein as well as virtual assistant data described above. Nonvolatile memory may also be used (e.g., to launch a boot-up routine and other instructions). Cloud-based storage may be used to supplement storage 908 or instead of storage 908.

Control circuitry 904 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 904 may also include scaler circuitry for upconverting and downconverting content into the preferred output format of user equipment 900. Control circuitry 904 may also include digital-to-analog converter circuitry and analog-to-digital converter circuitry for converting between digital and analog signals. The tuning and encoding circuitry may be used by user equipment device 900, 901 to receive and to display, to play, or to record content. The tuning and encoding circuitry may also be used to receive media consumption data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 908 is provided as a separate device from user equipment device 900, the tuning and encoding circuitry (including multiple tuners) may be associated with storage 908.

Control circuitry 904 may receive instruction from a user by way of user input interface 910. User input interface 910 may be any suitable user interface, such as a remote control, mouse, trackball, keypad, keyboard, touch screen, touchpad, stylus input, joystick, voice recognition interface, or other user input interfaces. Display 912 may be provided as a stand-alone device or integrated with other elements of each one of user equipment device 900 and user equipment device 901. For example, display 912 may be a touchscreen or touch-sensitive display. In such circumstances, user input interface 910 may be integrated with or combined with display 912. In some embodiments, user input interface 910 includes a remote-control device having one or more microphones, buttons, keypads, any other components configured to receive user input or combinations thereof. For example, user input interface 910 may include a handheld remote-control device having an alphanumeric keypad and option buttons. In a further example, user input interface 910 may include a handheld remote-control device having a microphone and control circuitry configured to receive and identify voice commands and transmit information to set-top box 915.

Audio output equipment 914 may be integrated with or combined with display 912. Display 912 may be one or more of a monitor, a television, a liquid crystal display (LCD) for a mobile device, amorphous silicon display, low-temperature polysilicon display, electronic ink display, electrophoretic display, active matrix display, electro-wetting display, electro-fluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. A video card or graphics card may generate the output to the display 912. Audio output equipment 914 may be provided as integrated with other elements of each one of device 900 and equipment 901 or may be stand-alone units. An audio component of videos and other content displayed on display 912 may be played through speakers (or headphones) of audio output equipment 914. In some embodiments, audio may be distributed to a receiver (not shown), which processes and outputs the audio via speakers of audio output equipment 914. In some embodiments, for example, control circuitry 904 is configured to provide audio cues to a user, or other audio feedback to a user, using speakers of audio output equipment 914. There may be a separate microphone 916 or audio output equipment 914 may include a microphone configured to receive audio input such as voice commands or speech. For example, a user may speak letters or words that are received by the microphone and converted to text by control circuitry 904. In a further example, a user may voice commands that are received by a microphone and recognized by control circuitry 904. Camera 918 may be any suitable video camera integrated with the equipment or externally connected. Camera 918 may be a digital camera comprising a charge-coupled device (CCD) and/or a complementary metal-oxide semiconductor (CMOS) image sensor. Camera 918 may be an analog camera that converts to digital images via a video card.

The virtual assistant may be implemented using any suitable architecture. For example, it may be a stand-alone application wholly implemented on each one of user equipment device 900 and user equipment device 901. In such an approach, instructions of the application may be stored locally (e.g., in storage 908), and data for use by the application is downloaded on a periodic basis (e.g., from an out-of-band feed, from an Internet resource, or using another suitable approach). Control circuitry 904 may retrieve instructions of the application from storage 908 and process the instructions to provide media consumption and social network interaction functionality and generate any of the displays discussed herein. Based on the processed instructions, control circuitry 904 may determine what action to perform when input is received from user input interface 910. For example, movement of a cursor on a display up/down may be indicated by the processed instructions when user input interface 910 indicates that an up/down button was selected. An application and/or any instructions for performing any of the embodiments discussed herein may be encoded on computer-readable media. Computer-readable media includes any media capable of storing data. The computer-readable media may be non-transitory including, but not limited to, volatile and non-volatile computer memory or storage devices such as a hard disk, floppy disk, USB drive, DVD, CD, media card, register memory, processor cache, Random Access Memory (RAM), etc.

Control circuitry 904 may allow a user to provide user profile information or may automatically compile user profile information. For example, control circuitry 904 may access and monitor network data, video data, audio data, processing data, participation data from a social network profile. Control circuitry 904 may obtain all or part of other user profiles that are related to a particular user (e.g., via social media networks), and/or obtain information about the user from other sources that control circuitry 904 may access. As a result, a user can be provided with a unified experience across the user's different devices.

In some embodiments, the virtual assistant is a client/server-based application. Data for use by a thick or thin client implemented on each one of user equipment device 900 and user equipment device 901 may be retrieved on-demand by issuing requests to a server remote to each one of user equipment device 900 and user equipment device 901. For example, the remote server may store the instructions for the application in a storage device. The remote server may process the stored instructions using circuitry (e.g., control circuitry 904) and generate the displays discussed above and below. The client device may receive the displays generated by the remote server and may display the content of the displays locally on device 900. This way, the processing of the instructions is performed remotely by the server while the resulting displays (e.g., that may include text, a keyboard, or other visuals) are provided locally on device 900. Device 900 may receive inputs from the user via input interface 910 and transmit those inputs to the remote server for processing and generating the corresponding displays. For example, device 900 may transmit a communication to the remote server indicating that an up/down button was selected via input interface 910. The remote server may process instructions in accordance with that input and generate a display of the application corresponding to the input (e.g., a display that moves a cursor up/down). The generated display may then be transmitted to device 900 for presentation to the user.

In some embodiments, the virtual assistant may be downloaded and interpreted or otherwise run by an interpreter or virtual machine (run by control circuitry 904). In some embodiments, the virtual assistant may be encoded in the ETV Binary Interchange Format (EBIF), received by control circuitry 904 as part of a suitable feed, and interpreted by a user agent running on control circuitry 904. For example, the virtual assistant may be an EBIF application. In some embodiments, the virtual assistant may be defined by a series of JAVA-based files that are received and run by a local virtual machine or other suitable middleware executed by control circuitry 904.

FIG. 10 is a diagram of an illustrative system 1000, in accordance with some embodiments of this disclosure. Virtual assistant devices 11,51 (e.g., user device of FIG. 1 or FIG. 2, or any other suitable devices, or any combination thereof) may be coupled to communication network 1006. Communication network 1006 may be one or more networks including the Internet, a mobile phone network, mobile voice or data network (e.g., a 5G, 4G, or LTE network, or any other suitable network or any combination thereof), cable network, public switched telephone network, or other types of communication network or combinations of communication networks. Paths (e.g., depicted as arrows connecting the respective devices to the communication network 1006) may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. Communications with the client devices may be provided by one or more of these communications paths but are shown as a single path in FIG. 10 to avoid overcomplicating the drawing.

Although communications paths are not drawn between user equipment devices, these devices may communicate directly with each other via communications paths as well as other short-range, point-to-point communications paths, such as USB cables, IEEE 1394 cables, wireless paths (e.g., Bluetooth, infrared, IEEE 702-11x, etc.), or other short-range communication via wired or wireless paths. The user equipment devices may also communicate with each other directly through an indirect path via communication network 1006.

System 1000 may comprise media content source 1002, one or more servers 1004, and one or more social network services. In some embodiments, the virtual assistant may be executed at one or more of control circuitry 1011 of server 1004 (and/or control circuitry of virtual assistant devices 11,51.

In some embodiments, server 1004 may include control circuitry 1011 and storage 1014 (e.g., RAM, ROM, Hard Disk, Removable Disk, etc.). Storage 1014 may store one or more databases. Server 1004 may also include an input/output path 1012. I/O path 1012 may provide media consumption data, social networking data, device information, or other data, over a local area network (LAN) or wide area network (WAN), and/or other content and data to control circuitry 1011, which may include processing circuitry, and storage 1014. Control circuitry 1011 may be used to send and receive commands, requests, and other suitable data using I/O path 1012, which may comprise I/O circuitry. I/O path 1012 may connect control circuitry 1011 (and specifically control circuitry) to one or more communications paths. I/O path 1012 may comprise I/O circuitry.

Control circuitry 1011 may be based on any suitable control circuitry such as one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, control circuitry 1011 may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 1011 executes instructions for an emulation system application stored in memory (e.g., the storage 1014). Memory may be an electronic storage device provided as storage 1014 that is part of control circuitry 1011.

The processes described above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be illustrative and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method, performed by a first device of a plurality of devices, comprising:

receiving a voice query;

determining a media context from first media content, the media context being colocated and contemporaneous with the voice query;

processing the voice query to generate a textual query;

performing a keyword identification skill to identify a keyword from the voice query;

determining a character depicted in the first media content based, at least in part, on the textual query;

identifying a selected response content provider from a plurality of response content providers based on the keyword, the media context, and the determined character, wherein each of the plurality of response content providers own respective copyrights to respective characters;

communicating the textual query, the media context, and the determined character to the selected response content provider via a network interface;

receiving query response data from the selected response content provider via the network interface, wherein the query response data comprises voice data generated based on the keyword, the media context, and the determined character, and wherein the voice data simulates a voice of the determined character;

generating, at an output of the first device, a query response based on the query response data;

receiving, at the first device, an indication to configure a second device of the plurality of devices to perform the keyword identification skill; and sharing, with the second device, the keyword identification skill, wherein sharing the keyword identification skill with the second device causes the second device to be configured to identify an association between the keyword and the selected response content provider.

2. The method of claim 1, wherein determining the media context comprises determining metadata from the media context, and wherein communicating the textual query and the media context to the selected response content provider includes communicating the metadata to the selected response content provider.

3. The method of claim 1, wherein the query response comprises response media content generated based on the query response data, the response media content comprising audio content based on the voice data.

4. The method of claim 3, wherein the query response data comprises character rendering data based on the media context, and wherein the response media content is generated based on the character rendering data.

5. The method of claim 3, wherein the query response data comprises scenery rendering data for scenery based on the media context, and wherein the response media content is generated based on the scenery rendering data.

6. The method of claim 3, wherein the response media content comprises a visual representation of the determined character based on the media context.

7. The method of claim 3, wherein the response media content comprises visual scenery based on the media context.

8. The method of claim 1, wherein the query response data comprises response media content generated by the selected response content provider.

9. The method of claim 8, wherein the response media content comprises a visual representation of the determined character based on the media context and the query response data.

10. The method of claim 8, wherein the response media content comprises visual scenery based on the media context and the query response data.

11. The method of claim 1, wherein processing the voice query to identify the keyword from the voice query comprises:

transmitting the textual query to a search engine via the network interface;

receiving a search result from the search engine via the network interface; and identifying the keyword from the search result.

12. A system comprising:

input/output (I/O) circuitry configured to receive a voice query;

a network interface; and control circuitry of a first device of a plurality of devices configured to:

determine a media context from first media content, the media context being colocated and contemporaneous with the voice query;

process the voice query to generate a textual query;

perform a keyword identification skill to identify a keyword from the voice query;

determine a character depicted in the first media content based, at least in part, on the textual query;

identify a selected response content provider from a plurality of response content providers based on the keyword, the media context, and the determined character, wherein each of the plurality of response content providers own respective copyrights to respective characters; and communicate the textual query, the media context, and the determined character to the selected response content provider via the network interface;

wherein the I/O circuitry is further configured to:

receive query response data from the selected response content provider via the network interface, wherein the query response data comprises voice data generated based on the keyword, the media context, and the determined character, and wherein the voice data simulates a voice of the determined character;

generate, at an output of the first device, a query response based on the query response data; and receive, at the first device, an indication to configure a second device of the plurality of devices to perform the keyword identification skill; and wherein the control circuitry is further configured to share, with the second device, the keyword identification skill, wherein sharing the keyword identification skill with the second device causes the second device to be configured to identify an association between the keyword and the selected response content provider.

13. The system of claim 12, wherein the control circuitry is further configured to determine metadata from the media context and to communicate the metadata to the selected response content provider with the textual query and the media context.

14. The system of claim 12, wherein the query response comprises response media content, and wherein the control circuitry is further configured to generate the response media content based on the query response data and the voice data.

15. The system of claim 14, wherein the query response data comprises character rendering data based on the media context, and wherein the control circuitry is configured to generate the response media content based on the character rendering data.

16. The system of claim 14, wherein the query response data comprises scenery rendering data for scenery based on the media context, and wherein the control circuitry is configured to generate the response media content based on the scenery rendering data.

17. The system of claim 12, wherein the query response data comprises response media content generated by the selected response content provider.

18. The system of claim 17, wherein the response media content comprises a visual representation of the determined character based on the media context and the query response data.

19. The system of claim 17, wherein the response media content comprises visual scenery based on the media context and the query response data.

20. The system of claim 12, wherein the control circuitry, when processing the voice query to identify the keyword from the voice query, is configured to:

transmit the textual query to a search engine via the network interface;

receive a search result from the search engine via the network interface; and identify the keyword from the search result.

* * * * *